(12) United States Patent
Navon et al.

(10) Patent No.: US 9,088,689 B2
(45) Date of Patent: Jul. 21, 2015

(54) AUTOMATED FIELD OF VIEW ADJUSTMENT BASED ON SCREEN SIZE

(71) Applicant: AVAYA, INC., Basking Ridge, NJ (US)

(72) Inventors: Oren Navon, Ganey Tikva (IL); Yaniv Levy, Ramat Hasharon (IL); Itai E. Zilbershtein, Hod-Hasharon (IL); Nadav Ramati, Modi'in (IL)

(73) Assignee: AVAYA, INC., Basking Ridge, NJ (US)

( * ) Notice: Subject to any disclaimer, the term of this patent is extended or adjusted under 35 U.S.C. 154(b) by 16 days.

(21) Appl. No.: 13/928,081

(22) Filed: Jun. 26, 2013

(65) Prior Publication Data

US 2015/0002609 A1    Jan. 1, 2015

(51) Int. Cl.
| | |
|---|---|
| *H04N 7/15* | (2006.01) |
| *H04N 7/14* | (2006.01) |
| *H04M 11/08* | (2006.01) |
| *H04L 12/18* | (2006.01) |

(52) U.S. Cl.
CPC .............. *H04N 7/142* (2013.01); *H04L 12/18* (2013.01); *H04M 11/085* (2013.01)

(58) Field of Classification Search
CPC ...................................................... H04N 7/142
USPC .............. 250/208.2, 419; 345/207, 419; 348/14.04, 14.05, 14.08, 14.09, 14.1, 348/14.16, 14.07, 36, 159; 382/103, 217; 600/21
See application file for complete search history.

(56) References Cited

U.S. PATENT DOCUMENTS

| | | | |
|---|---|---|---|
| 6,563,528 B2 * | 5/2003 | Satoda .................... | 348/14.05 |
| 6,593,956 B1 * | 7/2003 | Potts et al. .............. | 348/14.09 |
| 8,169,463 B2 * | 5/2012 | Enstad et al. ............ | 348/14.08 |
| 8,203,590 B2 * | 6/2012 | Thielman et al. ........ | 348/14.05 |
| 8,237,769 B2 * | 8/2012 | Crenshaw et al. ....... | 348/14.04 |
| 8,243,989 B2 * | 8/2012 | Vendrig ................... | 382/103 |
| 8,248,454 B2 * | 8/2012 | Thielman ................. | 348/14.08 |
| 8,421,844 B2 * | 4/2013 | Matthews ................ | 348/14.16 |
| 8,760,519 B2 * | 6/2014 | Ozdemir et al. ......... | 348/159 |
| 8,885,882 B1 * | 11/2014 | Yin et al. ................. | 382/103 |
| 8,942,486 B1 * | 1/2015 | Martel et al. ............. | 382/217 |
| 2004/0263611 A1 * | 12/2004 | Cutler ..................... | 348/36 |
| 2006/0079729 A1 * | 4/2006 | Kim ........................ | 600/21 |
| 2009/0146982 A1 * | 6/2009 | Thielman et al. ........ | 345/207 |
| 2012/0038738 A1 * | 2/2012 | Matthews ................ | 348/14.1 |
| 2012/0050458 A1 * | 3/2012 | Mauchly et al. ......... | 348/14.16 |
| 2013/0321395 A1 * | 12/2013 | Chen et al. .............. | 345/419 |
| 2014/0284457 A1 * | 9/2014 | Smits ...................... | 250/208.2 |
| 2015/0002609 A1 * | 1/2015 | Navon et al. ............ | 348/14.07 |
| 2015/0097915 A1 * | 4/2015 | Navon et al. ............ | 348/14.1 |

* cited by examiner

*Primary Examiner* — Gerald Gauthier
(74) *Attorney, Agent, or Firm* — Cochran Freund & Young LLC

(57) ABSTRACT

Disclosed is a system and method for automatic adjustment to a camera field of view based on parameters negotiated during a video conference initiation.

14 Claims, 2 Drawing Sheets

AUTOMATED FIELD OF VIEW ADJUSTMENT BASED ON SCREEN SIZE

FIELD OF THE INVENTION

The field of the invention relates generally to viewing and display of video conference attendees.

BACKGROUND OF THE INVENTION

Video conferencing bridges the gap between call participants by providing options that allow the participants to view each other in various representations. One aspect of video conferencing is field-of-view (FOV) of the cameras that may be used to capture participants' images. Determining the right FOV can be an important consideration in video conferencing. The FOV can greatly impact user experience and satisfaction with a conferencing session, or system.

SUMMARY OF THE INVENTION

An embodiment of the invention may therefore comprise a method for automatically controlling a field of view of a video conference camera, the method comprising initiating a video conference with a first party and a second party, negotiating a session between the first party and the second party, and automatically adjusting a camera field of view of at least one of the first party or the second party.

An embodiment of the invention may further comprise a system for automatically controlling a field of view of a video conference camera, said system comprising a first video conference endpoint, and a second video conference endpoint, wherein the video conference parameters are negotiated between the first and second endpoints using a protocol and at least one of a camera field of view at said first and second endpoint is automatically adjusted in accordance with the parameters negotiated.

DETAILED DESCRIPTION OF THE EMBODIMENTS

Figure 1:
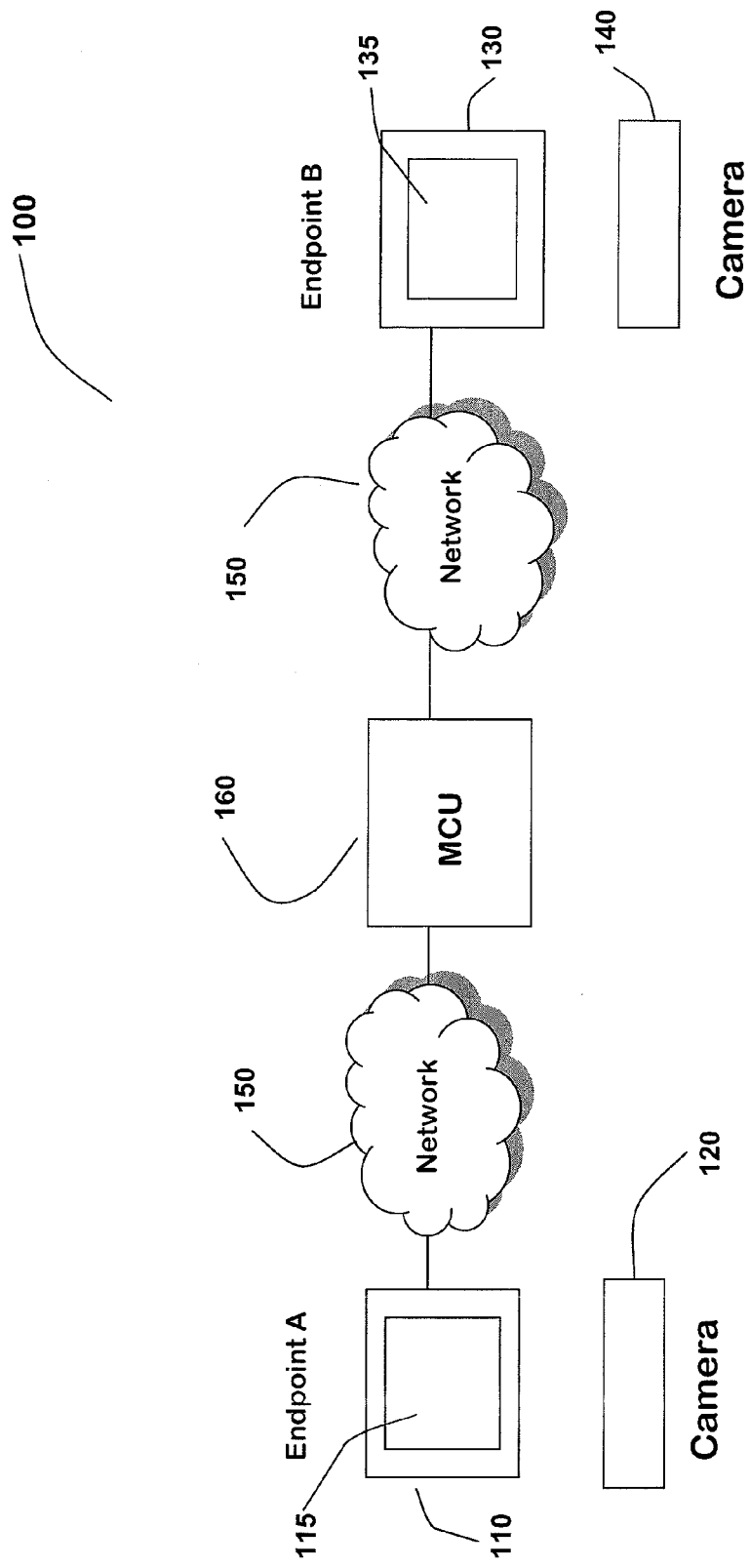
FIG. 1 shows a communication system for video conferencing.

Some embodiments may be illustrated below in conjunction with an exemplary video communication system. Although well suited for use with, e.g., a system using switch(es), server(s), and/or database(s), communications endpoints, etc., the embodiments are not limited to use with any particular type of video communication system or configuration of system elements. Videoconferencing is the conduct of a videoconference (also known as a video conference or video tele-conference) by a set of telecommunication technologies which allow two or more locations to communicate by simultaneous two-way video and audio transmissions.

Determining an appropriate field of view (FOV) for particular devices and associated cameras have implications for viewer experiences for video conferences. Generally, FOV describes the angular extent of a given scene that is imaged by a camera. Different FOVs may result in different experiences for users. For example, a smaller field of view for a camera may result in the capture of more of a participant's face and upper body, depending on the maintenance of a participant to a more narrowly defined area. Such as arrangement allows the displayed view of the participant to be more clear. A tradeoff of a smaller FOV, however, is that the viewer may not be able to see the speaker's hands and upper body or the speaker's surroundings, impacting the body language and the sense of immersion. A larger FOV for a camera may result in the capture of less of a participant's face and upper body, depending on the maintenance of a participant in a defined area. It is understood that this is relative in that a larger FOV will capture more of the speaker upper body and its surrounding area. This may result in an increase in the sense of immersion and body language. Also, having less area dedicated to a participant's face and upper torso may result in a loss of details related to that participant.

Endpoints are the devices and mechanisms used by participants to a conference to view the conference. Various video conferencing endpoints may differ in size and operation. For example, some endpoints may display a video conference on a large screen, such as a 27" LCD, attached to a computer which runs an appropriate video conferencing software. Other endpoints may be of different size and configuration, such as a video phone or a cellular phone. These other types of endpoints may have smaller, varying screen sizes, such as a 5" display on a business video phone.

The size of a display, as discussed above, utilized by a video call participant may impact the participant's preference as to the type of image displayed from an other party. For instance, when using smaller displays, such as a 5" display, a user may prefer viewing images of other viewers such that the other participants' faces and upper torsos take up most of the screen space. On the other side of things, when using larger displays, such as a 24" or larger screen, a user may prefer viewing images of other viewers such that the other participant's faces and upper torso do not take up a proportionally large portion of the image. In this instance, a viewer may prefer to see more of the background scenery, increasing the sense of immersion.

The above generalities can be presented in a more specific set of examples as follows: In a first particular video conference between party A and party B, party A may have a 5" display. As noted above, the preference of party A may be that party B's camera utilize a small FOV. The image on the screen of party A would according be comprised mostly of party B's head and upper torso, with the background scenery limited. However, if party A has a 27" display, party A may prefer that party B's camera utilize a larger FOV. The image on the screen of party A would accordingly be comprised more of the background scenery. The intent here is that the image on a larger screen appears more natural on A's large display. It is understood here that FOV preferences may vary between users. The above preferences are noted as examples of what one particular party may desire and are not intended to be applied universally. It is also noted that the screen sizes noted above are relative. While a 5" screen is small in comparison to a 27" screen, it is not intended that the small and large labels are absolute.

In certain situations, a camera's FOV is adjustable at the endpoint where the camera is located. A user can manually, or through electro-mechanical mechanisms, adjust the FOV of a camera to accommodate a perceived preference of another user. It is understood that an adjustable FOV camera is more expensive than a fixed-FOV camera. Further, it is understood that adjustable FOV cameras are not always in use, such as in situations where personal video conferencing equipment such as video phones are utilized. Further, it is understood that manual, or through electro-mechanical mechanisms, generally entail active adjustments and readjustments to zoom levels during a call. An example of this may be when one party, party A for example, is able to modify party B's camera FOV via remote control. It is understood that remote control means to control a camera are available. Party A may have accordingly adjusted party B's camera FOV to view a larger portion of party B's surroundings to satisfy party A's preference for a particular screen size. Later, party C may call party B. Party C may be equipped with a different size screen than party A and may thus have different preference settings for party B's camera FOV. Party B's camera FOV will need to be readjusted to that different FOV preference. Further, it is understood that even if zoom exists in party B's camera, in many systems and solutions there is no mechanism to allow the transmitter to control the zoom feature.

In an embodiment of the invention, a method and system provides a way to automatically choose and utilize a desired FOV. Further, the method and system provide a way to automatically choose and utilize a desired FOV in a variety of systems and dimensions, including, for example, low-cost video endpoints such as video phones.

IP video calls, such as conference calls, are generally set up through the use of exchange of messages in which the systems of two or more parties negotiate the parameters required for the video and audio session that will be created for the call. As an example, certain systems may use SIP (Session Initiation Protocol). The participants in a call will negotiate which video and audio coding scheme is used via the Session Description Protocol (SDP). It is understood that the negotiations may include standard data-elements as well as vendor specific elements.

Existing SDP parameters for H.264 are well defined. Moreover, additional definitions for SDP parameters for H.263, H.264 scalable video coding and other video codecs may be found. Those skilled in the art will understand the parameters associated with SDP coding. In an embodiment of the invention, a selection of additional parameters may be added to SDP parameters existing in the defined parameters mentioned above. The additional parameters may comprise: a "screen size" parameter which defines the screen size which is used by the device for rendering the remote party's video stream; and a "screen-resolution" parameter which defines the resolution (width×height) of a device's screen which in turn may provide information on a screen's aspect ratio. It is the responsibility of each device, or party, in a negotiation to submit parameters respecting its own video display capabilities. Based on the submitted parameters, the remote, or other, party is enabled to select the appropriate FOV to be used. As well as adding parameters to SDP existing parameter, existing media capabilities defined in ITU-T specifications may be extended to include a screen-size and screen-resolution definition.

The following example demonstrates the use of a use of SDP parameters to negotiate a FOV preference—a transmitter has a 27" display with 1080p resolution and a receiver has a 5" display with 800×480 resolution. The transmitter SDP will include the following parameters: m=video 49170 RTP/AVP 98, a=rtpmap:98 H264/9000, a=mtp:98 profile-level-id=42A014, and packetization-mode=1, level-assymmetry-allowed=1, screen-size=27, andscreen-resolution=1'92× 1080. The receiver SDP will include the following parameters: m=video 49170 RTP/AVP 98, a=rtpmap:98 H264/9000, a=fmtp:98 profile-level-id=42A01E; //Baseline profile, level 3.0, and packetization-mode=l, level-asymmetry-allowed=1, screen-size=5 and screen-resolution=800× 480. As noted above, user preferences can be used to optionally modify the SDP parameter to suit particular user's needs.

In the negotiation phase to determine coding schemes, one or more of the endpoints are enabled to specify to the other endpoints involved in the video conference a preferred FOV for the other party's camera. This desired FOV may be based on the screen size of the specifying party. A party may also set user defined parameters to specify a FOV for another party's camera FOV based on personal preference of the user. It is understood that a default may be for the specification to be based on a screen size and for user preference to be an option.

In the event that a FOV is based on an endpoint's screen size, during the negotiation phase, an endpoint will consult a FOV and display size table. Data exchange can be performed through the extension mechanism of the SDP protocol. Those skilled in the art will understand the usage of the extension mechanism of the SDP protocol.

When the video conference call is in progress, the endpoints will set up their respective cameras to the FOV desired by the other party. Some cameras may be enabled with pan/tilt/zoom (PTZ) controls. For cameras with PTZ controls, the camera set up to preferred FOV settings will be done through the electro-mechanical PTZ. For cameras which are not enabled with PTZ controls, the camera set up to preferred FOV settings will be done through methodologies including cropping and scaling an image captured by the camera's image sensor. Those skilled in the art will understand the usage of cropping and scaling of camera images. The methodologies used when an electro-mechanical PTZ camera is not in use may be performed at different places along the communication path. The methodology may be performed at the endpoint where the camera resides, or it may be performed at the MCU.

In an embodiment of the invention where an endpoint is not enabled to perform a methodology to adjust the FOV of a camera as described above, the endpoint where a resulting image is viewed may be enabled to crop and scale a received image to correspond to parameters supplied in the negotiation phase of the video conference.

FIG. 1 shows a communication system for video conferencing. The system 100 comprises a first endpoint 110 and a second endpoint 130. Both endpoints 110, 130 comprise video equipment which includes at least a display 115, 135. The endpoints 110, 130 are connected to a camera 120, 140. The connection to the cameras 120, 140 is such that the endpoint is capable of receiving information from the camera 120, 140 and also of controlling various functions of the camera 120, 140. The controllable functions include at least those that affect the FOV of the camera 120, 140. Each endpoint 110, 130 communicates through a network 150 and an MCU 160.

Figure 2:
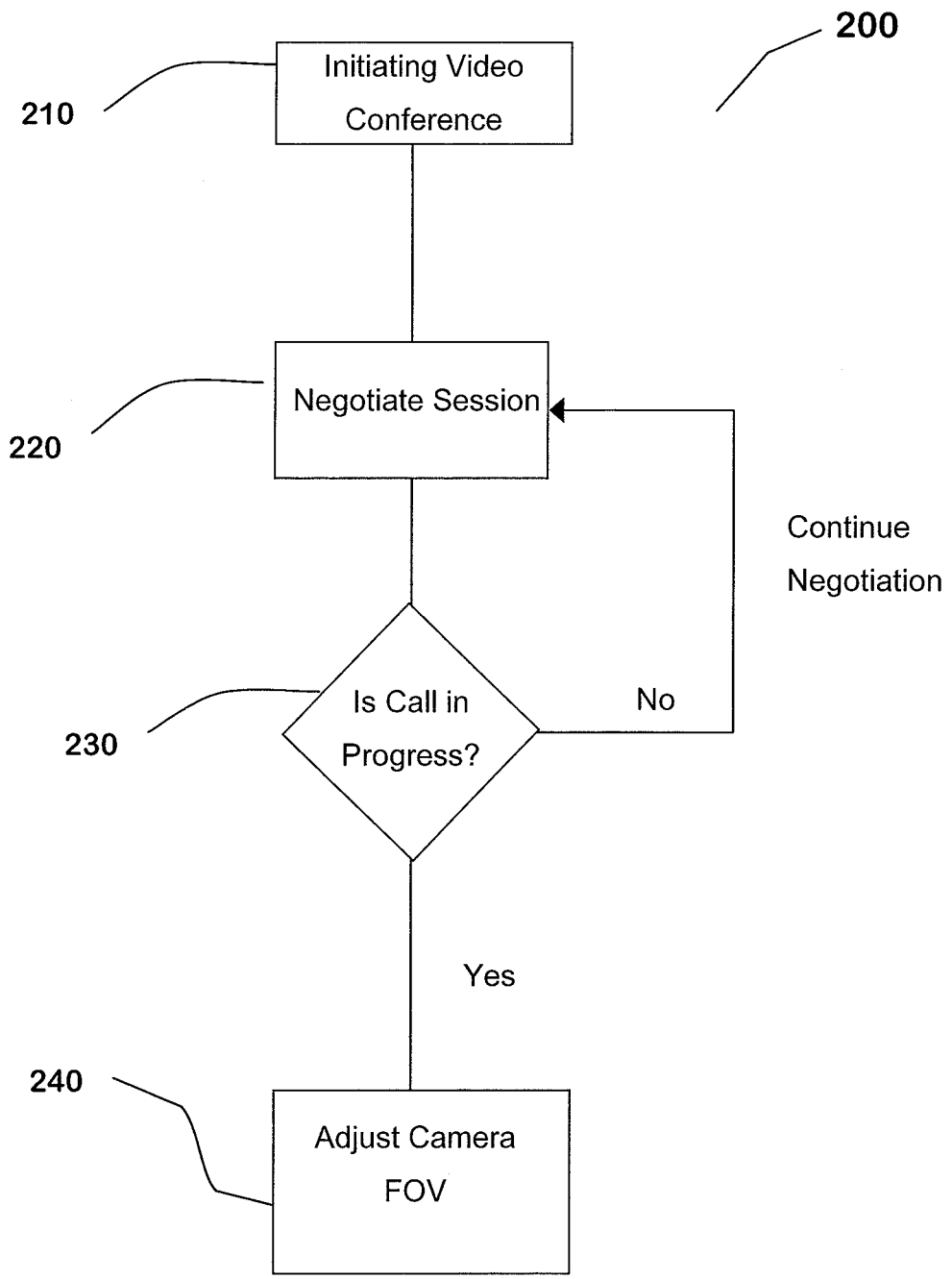
FIG. 2 is a flow diagram of a method of controlling a camera FOV.

FIG. 2 is a flow diagram of a method of controlling a camera FOV. In a method 200 of the invention, a video conference is first initiated 210. This is simply no more that connecting through the mechanisms outlined in FIG. 1. Next, a negotiation session 220 is performed. The negotiation session is described above and is understood in the art. Next it is determined if a video call is in progress 230. If the call is not in progress, the negotiation session 220 may need to complete. If the call is in progress and the negotiation session is complete the FOV of at least one camera being utilized in the video conference will be adjusted automatically 240. This automatic adjustment is discussed above and may be performed in a manner suitable to the type of camera being used.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for automatically controlling a field of view of a video conference camera, said method comprising:
    initiating a video conference with a first endpoint and a second endpoint;
    negotiating a session between the first endpoint and the second endpoint; and
    automatically adjusting a camera field of view in accordance with the negotiation of said session, by modifying an angular extent of a scene imaged by said camera and displayed at one of said endpoints, to accommodate a preferred field of view setting;
    wherein said modifying an angular extent of a scene imaged by said camera and displayed at one of said first endpoint and said second endpoint comprises changing one of a pan/tilt/zoom setting of said camera and a cropping and scaling of said image captured by an image sensor of said camera.

2. The method of claim 1, wherein the process of negotiating a session comprises providing at least one additional parameter to a protocol.

3. The method of claim 2, wherein the protocol is Session Description Protocol.

4. The method of claim 2, wherein the at least one additional parameter comprises one of screen size parameter and screen resolution parameter.

5. The method of claim 1, wherein the process of negotiating a session comprises providing a plurality of additional parameters to a protocol.

6. The method of claim 5, wherein the protocol is Session Description Protocol.

7. The method of claim 5, wherein the plurality of additional parameters comprises a screen size parameter and a screen resolution parameter.

8. The method of claim 1, wherein the process of automatically adjusting a camera field of view comprises looking up information received in the negotiating process to determine a preferred field of view.

9. The method of claim 8, wherein the information is looked up in a table.

10. A system for automatically controlling a field of view of a video conference camera, said system comprising:
    a first video conference endpoint;
    a second video conference endpoint; and
    negotiation of video conference parameters;
    wherein the video conference parameters, comprising a camera field of view for at least one of the first endpoint and the second endpoint, are negotiated between the first and second endpoints using a protocol and at least one of a camera field of view at said first and second endpoint is automatically adjusted in accordance with the parameters negotiated and wherein said adjustment comprises a modification of an angular extent of a scene imaged by a camera of at least one of said first and second endpoints to accommodate a preferred field of view setting.

11. The system of claim 10, wherein said conference parameters comprise at least one of a screen size parameter and a screen resolution parameter.

12. The system of claim 11, wherein said automatic adjustment is made in reference to a display size table.

13. The system of claim 10, wherein said conference parameters comprise both a screen size parameter and a screen resolution parameter.

14. The system of claim 13, wherein said automatic adjustment is made in reference to a display size table.

* * * * *